United States Patent
Ljung et al.

(10) Patent No.: US 12,022,495 B2
(45) Date of Patent: Jun. 25, 2024

(54) METHOD AND APPARATUS FOR ADAPTIVE BANDWIDTH OPERATION

(71) Applicant: Sony Corporation, Tokyo (JP)

(72) Inventors: Rickard Ljung, Lund (SE); Basuki Priyanto, Lund (SE); Nafiseh Mazloum, Lund (SE)

(73) Assignee: Sony Group Corporation, Tokyo (JP)

(*) Notice: Subject to any disclaimer, the term of this patent is extended or adjusted under 35 U.S.C. 154(b) by 563 days.

(21) Appl. No.: 17/270,078

(22) PCT Filed: Sep. 20, 2019

(86) PCT No.: PCT/US2019/052055
§ 371 (c)(1),
(2) Date: Feb. 22, 2021

(87) PCT Pub. No.: WO2020/068566
PCT Pub. Date: Apr. 2, 2020

(65) Prior Publication Data
US 2021/0329666 A1    Oct. 21, 2021

(30) Foreign Application Priority Data

Sep. 28, 2018   (SE) .................... 1830269-5

(51) Int. Cl.
*H04W 24/08* (2009.01)
*H04W 72/52* (2023.01)
*H04W 72/542* (2023.01)

(52) U.S. Cl.
CPC ........... *H04W 72/52* (2023.01); *H04W 24/08* (2013.01); *H04W 72/542* (2023.01)

(58) Field of Classification Search
CPC .... H04W 72/542; H04W 24/04; H04W 76/15
USPC .......................................... 370/400, 403.329
See application file for complete search history.

(56) References Cited

U.S. PATENT DOCUMENTS

| | | |
|---|---|---|
| 2011/0243038 A1 | 10/2011 | Challa |
| 2015/0078227 A1 | 3/2015 | Kong |
| 2015/0079945 A1 | 3/2015 | Rubin |
| 2015/0319778 A1 | 11/2015 | Folke |
| 2018/0199343 A1 | 7/2018 | Deogun et al. |
| 2018/0220345 A1 | 8/2018 | Moon et al. |
| 2018/0279353 A1 | 9/2018 | Shaheen et al. |

(Continued)

OTHER PUBLICATIONS

International Search Report and Written Opinion from corresponding International Application No. PCT/US2019/052055 dated Dec. 9, 2019, 18 pages.

(Continued)

*Primary Examiner* — Dang T Ton
(74) *Attorney, Agent, or Firm* — Tucker Ellis LLP

(57) ABSTRACT

A network node (12) schedules a wireless communications device (14) to utilize a subsection (54) of a previously configured active bandwidth part (46). The wireless communications device (14) utilizes the subsection (54) for operations such as monitoring for control signaling from the network node (12), channel measurements, and/or for communication between the wireless communications device (14) and the network node (12) (e.g. uplink and/or downlink traffic). Accordingly, the wireless communications device (14) may reduce power consumption by not monitoring and/or using a wider bandwidth.

20 Claims, 7 Drawing Sheets

(56) References Cited

U.S. PATENT DOCUMENTS

2022/0404454 A1* 12/2022 Agee ................... G01S 5/0268

OTHER PUBLICATIONS

Office Action from corresponding Swedish Application No. 1830269-5 dated Mar. 15, 2019.
MediaTek Inc., "Remaining Details on Bandwidth Part Operation in NR Document for: Discussion", 3rd Generation Partnership Project (3GPP), Prague, Oct. 8, 2017, R1-1718327, 13 pages.
Huawei et al., "Impacts of BWP on DRX", 3rd Generation Partnership Project (3GPP), Prague, Oct. 8, 2017, R2-1710208, 2 pages.
Qualcomm Incorporated, "UE Power Saving during Active State", 3rd Generation Partnership Project (3GPP), Prague, Oct. 8, 2017, R2-1711904, 9 pages.
Qualcomm Incorporated, "Views on UE Power Saving", 3rd Generation Partnership Project (3GPP), Gothenburg, Sweden, Aug. 17, 2018, R1-1809462, 11 pages.
Sony, "Enhancement of NR Power Saving Features", 3rd Generation Partnership Project (3GPP), Chengdu, China, Sep. 28, 2018, R1-1811137, 3 pages.

* cited by examiner

METHOD AND APPARATUS FOR ADAPTIVE BANDWIDTH OPERATION

RELATED APPLICATION DATA

This applications claims the benefit of Swedish Patent Application No. 1830269-5, filed Sep. 28, 2018, the disclosure of which is incorporated herein by reference in its entirety.

TECHNICAL FIELD OF THE INVENTION

The technology of the present disclosure relates generally to wireless communications in a network environment and, more particularly, to a method and apparatus for adaptive bandwidth operation.

BACKGROUND

Demand for data traffic on wireless communication system continues to increase. Since widespread commercialization of fourth generation (4G) wireless systems, such as a Long Term Evolution (LTE) system or an LTE-Advanced (LTE-A) system standardized by the 3rd Generation Partnership Project (3GPP), next generation wireless systems are being developed. Once such system, by the 3GPP, is a fifth generation (5G) or New Radio (NR) wireless system.

The NR system, a first version of which was specified during 3GPP Release 15, is a communication protocol for enhanced mobile broadband (eMBB), which allows for large frequency band allocations, high order modulations, and advanced multi-antenna solutions. The system design, however, may result in relatively higher power consumption from a user equipment (UE) perspective. In particular, UE power consumption may increase while the UE is in connected mode, since the UE may be required to handle large bandwidths, many different connections, beams, etc. Therefore, solutions that leverage opportunity to reduce power consumptions are beneficial in NR systems as well as other wireless communication systems.

SUMMARY

The disclosed approach provides adaptive bandwidth utilization for wireless communications devices (e.g. UEs) in a wireless communications system to reduce power consumption. In particular, the techniques described herein may reduce power consumption while the wireless communications devices are in a connected state (e.g. RRC_CONNECTED). A network node may schedule a wireless communications device to utilize a subsection of a previously configured bandwidth. The wireless communications device utilizes the subsection for operations such as monitoring for control signaling from the network node, channel measurements, and/or for communication between the wireless communications device and the network node (e.g. uplink and/or downlink traffic). Accordingly, the wireless communications device may reduce power consumption through not monitoring and/or using a wider bandwidth (e.g. a full bandwidth configured for the device).

According to one aspect of the disclosure, a method for adaptive bandwidth operation performed by a network node of a wireless communications system includes scheduling a subsection of an active bandwidth part, allocated to a wireless communications device, for use by the wireless communications device; signaling allocation of the subsection of the active bandwidth part to the wireless communication device.

According to one embodiment, the method includes initially configuring the wireless communications device with one or more bandwidth parts, wherein at least one bandwidth part is the active bandwidth part.

According to another embodiment, the method includes signaling the initial configuration of the active bandwidth part to the wireless communications device.

According to another embodiment, the method includes determining that the wireless communications device can operate within a reduced bandwidth relative to the active bandwidth part.

According to another embodiment of the method determining that the wireless communication device can operate within the reduced bandwidth includes evaluating traffic conditions related to the wireless communication device.

According to another embodiment of the method, the traffic conditions include at least one of: a packet arrival time or packet size; a buffer status; an amount of data to be transferred between the wireless communication device and the network node; and/or a required quality of service level such as latency or data rate.

According to another embodiment of the method, determining that the wireless communications device can operate within the reduced bandwidth includes identifying that the wireless communications device has not utilized the active bandwidth part for a predetermined period of time.

According to another embodiment, the method includes determining that the wireless communications device, operating within the subsection of the active bandwidth part, should operate with a larger subsection of the active bandwidth part; scheduling the wireless communications device to utilize the larger subsection of the active bandwidth part; and signaling the scheduling of the larger subsection to the wireless communications device.

According to another embodiment of the method, the larger subsection of the bandwidth part is an entirety of the active bandwidth part.

According to another embodiment of the method, the subsection of the active bandwidth part is equivalent to a search space for the wireless communications device.

According to another embodiment of the method, the subsection of the active bandwidth part is different from a search space for the wireless communications device.

According to another embodiment, the method includes receiving a signal from the wireless communications device that provides assistance information related to bandwidth utilization; and determining whether the wireless communications device should operate within the subsection of the active bandwidth part based on the assistance information.

According to another embodiment of the method, the subsection of the active bandwidth part utilizes a different numerology from the active bandwidth part.

According to another embodiment, the method includes configuring the subsection of the bandwidth part according to one of a plurality of predetermined configurations.

According to another embodiment, the method includes signaling the allocation of the subsection of the bandwidth or signaling the scheduling of the larger subsection on a control channel.

According to another embodiment, the method includes allocating a plurality of subsections of the active bandwidth part to the wireless communications device, wherein the plurality of subsections have different characteristics.

According to another aspect of the disclosure, a wireless network node in a communication system includes a wireless interface over which with wireless communications devices are carried out over a plurality of bandwidth parts of a system bandwidth respectively configured for each wireless communications device; and a control circuit configured to adaptively configure bandwidth utilization of the wireless communications devices, wherein the control circuit causes the network node to: identify a condition that indicates that a wireless communications device can operate within a reduced bandwidth; schedule a subsection of an active bandwidth part utilization by the wireless communications device; and signal allocation of the subsection of the active bandwidth part to the wireless communications device.

According to one embodiment of the network node, the control circuit further causes the network node to initially configure the wireless communications device with one or more bandwidth parts, wherein at least one bandwidth part is the active bandwidth part.

According to one embodiment of the network node, the control circuit further causes the network node to signal the initial configuration of the active bandwidth part to the wireless communications device.

According to one embodiment of the network node, the condition includes at least one of: a packet arrival time or packet size; a buffer status; an amount of data to be transferred between the wireless communications device and the network node; and/or a required latency and/or a required data rate for data to be transmitted.

According to another embodiment of the network node, the control circuit further causes the network node to identify that the wireless communications device has not utilized the active bandwidth part for a predetermined period of time.

According to another embodiment of the network node, the control circuit further causes the network node to: determine that the wireless communications device, operating within the subsection of the active bandwidth part, should switch to operate within a larger subsection of the active bandwidth part; schedule the wireless communications device to utilize the larger subsection of the active bandwidth part; and signal the scheduling of the larger subsection to the wireless communications device.

According to another embodiment of the network node, the larger subsection of the active bandwidth part comprises an entirety of the active bandwidth part.

According to another embodiment of the network node, the control circuit further causes the network node to: receive a signal from the wireless communications device that provides assistance information related to bandwidth utilization; and determine whether the wireless communications device should operate within the subsection of the active bandwidth part or a larger bandwidth based on the assistance information.

According to another aspect of the disclosure, a method for adaptive bandwidth operation by a wireless communications device includes receiving a signal from a network node of a wireless communications system to utilize a subsection of a configured active bandwidth part; and performing at least one of measuring, monitoring, or data communication operations within the subsection of the configured active bandwidth part.

According to one embodiment of the method, the subsection of the configured active bandwidth part is the only bandwidth utilized by the wireless communication device for: monitoring for control signaling from the network node; performing measurements of channels; or transmitting data to and/or receiving data from the network node.

According to another embodiment, the method includes transmitting assistance information to the network node, wherein the assistance information is indicative of a preference for activation or deactivation of reduced bandwidth operations within the subsection of the configured active bandwidth part.

According to another embodiment, the method includes periodically measuring channel quality over an entirety of the configured active bandwidth part; and reporting the channel quality measured to the network node.

According to another embodiment, the method includes receiving a signal from network node to switch from utilizing the subsection of the configured active bandwidth part to an entirety of the configured active bandwidth part; and performing operations within the entirety of the configured active bandwidth part.

According to another aspect of the disclosure, a wireless communications device includes a wireless interface over which wireless communications with a network node are carried out within an active bandwidth part; and a control circuit configured to control the wireless communications device, wherein the control circuit configures the wireless communications device to: receive a signal from the network node to utilize a subsection of the active bandwidth part; and perform at least one of measuring, monitoring, or data communication operations within the subsection of the active bandwidth part.

According to one embodiment of the wireless communications device, the control circuit further causes the wireless communications device to only utilize the subsection of the active bandwidth to: monitor for control signaling from the network node; perform channel measurements; or transmit and/or receive data from the network node.

According to another embodiment of the wireless communications device, the control circuit further causes the wireless communications device to transmit assistance information to the network node, wherein the assistance information is indicative of a preference for activation or deactivation of reduce bandwidth operations within the subsection of the active bandwidth part.

DETAILED DESCRIPTION OF EMBODIMENTS

Introduction

Figure 1:
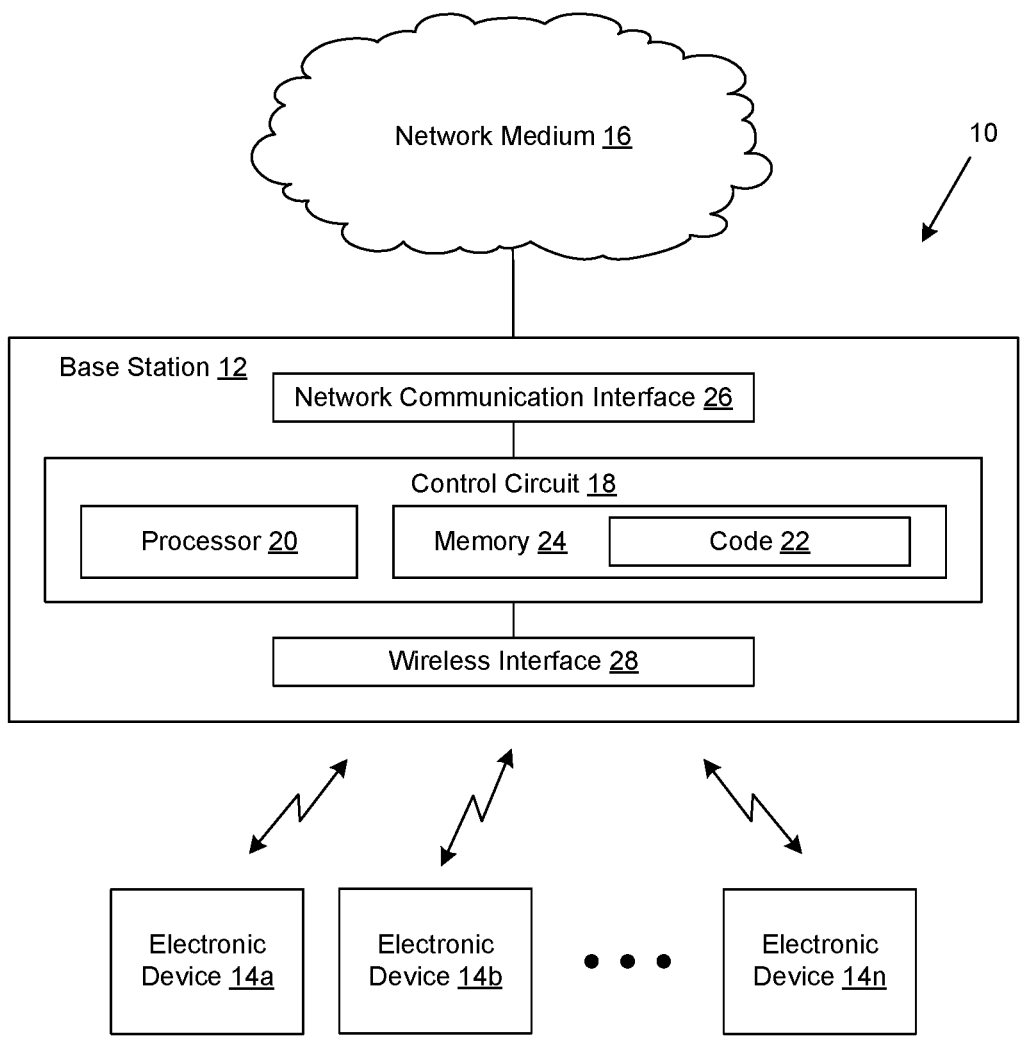
FIG. 1 is a schematic block diagram of a network communication system that enables adaptive bandwidth utilization for wireless communications.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below, in conjunction with the appended figures, are various embodiments of systems and methods for adaptive bandwidth utilization in a wireless communications system. A network node of a wireless communications system may configure a UE with multiple bandwidth parts, which are smaller portions of a carrier bandwidth or total system bandwidth. At a given time, the UE may utilize one such bandwidth part, which is referred to as an active bandwidth part. While the active bandwidth part may be smaller than the carrier bandwidth, the active bandwidth part may still exceed the requirements of the UE at any given time. Accordingly, the network node may dynamically adjust bandwidth utilization by the UE within the active bandwidth part, without specifically reassigning or reconfiguring the UE to different bandwidth parts.

System Architecture

FIG. 1 is a schematic diagram of an exemplary network communication system 10 for implementing the disclosed techniques. It will be appreciated that the illustrated communication system is representative and other systems may be used to implement the disclosed techniques. The exemplary network system 10 includes a network node 12, which is also referred to as base station 12, that operates in accordance with a cellular protocol, such as a protocol promulgated by 3GPP or another standard. For instance, the network system 10 may operate in accordance with LTE, LTE-A, or a 5G NR standards. However, it is to be appreciated that the techniques described herein can be applied to substantially any wireless or wired communication system to enable dynamic bandwidth utilization within an allocated bandwidth without the need for explicit reconfiguration.

The network communication system 10 of the illustrated example supports cellular-type protocols, which may include circuit-switched network technologies and/or packet-switched network technologies. The network communication system 10 includes a base station 12 that services one or more electronic devices 14 (e.g. UEs or wireless communications devices), designated as electronic devices 14a through 14n in FIG. 1. The base station 12 may support communications between the electronic devices 14 and a network medium 16 through which the electronic devices 14 may communicate with other electronic devices 14, servers, devices on the Internet, etc. The base station 12 may be an access point, an evolved NodeB (eNB) in a 4G network, a next generation NodeB (gNB) in a 5G or NR network, or another network node. As utilized herein, the term "base station" may refer, generally, to any device or network node that services user devices and enables or facilitates communications between the user devices and the network medium and, thus, includes the specific examples above and other supporting network nodes depending on the network implementation.

Network communication system 10 may be a system, such as an NR system, that assigns user devices to utilize a smaller portion of bandwidth compared to a total system bandwidth. The smaller portion may be referred to as a bandwidth part. In NR systems, for example, a bandwidth part consists of a group of contiguous physical resource blocks (PRBs). A user device may be configured with up to 3 bandwidth parts in addition to a default bandwidth part. The default bandwidth part is a bandwidth part that includes system information such as a synchronization signal blocks (SSBs). Such system information may include, without limitation, a primary synchronization signal (PSS), secondary synchronization signal (SSS), a broadcast channel (BCH), etc. In general, system information is broadcasted information for purposes including, but not limited to, informing devices about timing alignments (e.g. synchronization signals) to know where frames start and end, frame numbering to understand where in time within a sequence the system is currently operating, cell specific information (e.g. cell identity, cell configuration, etc.), cell specific parameter configurations for devices, paging indicators, etc.

A carrier bandwidth in NR systems may be wide (e.g. 1 GHz). A bandwidth part (e.g. a portion of the NR carrier bandwidth) may still be relatively wide and can be in the order of hundreds of Megahertz. A user device may utilize one configured bandwidth part at a time and the utilized bandwidth part may be referred to as an active bandwidth part. Depending on traffic conditions, the entire active bandwidth part may not be needed. In such cases, a user device can be dynamically adjusted to utilize a reduced bandwidth within the active bandwidth part without specifically reassigning or reconfiguring the user device to different, alternative bandwidth parts. Such a dynamic or adaptive adjustment may provide additional power savings for user devices.

The base station 12 may configure an electronic device 14 to utilize a reduced bandwidth. The reduced bandwidth may be a subsection of an active bandwidth part assigned to the electronic device 14. To introduce power savings, the electronic device 14 need only monitor the subsection for data exchange of both control signaling and data traffic. In addition, the electronic device 14 may restrict measurements to the subsection. In practical effect, the bandwidth of the electronic device 14 is dynamically limited to the bandwidth of the subsection of the active bandwidth part. The electronic device 14 may also reduce a sampling rate to further reduce power consumption.

The base station 12 may activate or deactivate reduce bandwidth operations through scheduling electronic devices 14 with dynamic bandwidth allocations that may include the active bandwidth part (e.g. normal operation) or the subsection of the active bandwidth part (e.g. reduce bandwidth operation). To signal the allocation, the base station 12 may indicate a size of the subsection of the active bandwidth part as a direct size indication or as a fraction of the active bandwidth part or with reference to a predefined size (e.g. a predetermined configuration from a set of possible configurations or sizes).

Activation or deactivation determinations may be based on data traffic conditions, buffer status, and/or time-based criteria as described herein. In addition, the electronic devices 14 may transmit assistance information to the base station 12 to facilitate decisions regarding dynamic bandwidth utilization. For example, the electronic device 14 may indicate a bandwidth preference when transmitting a scheduling request. The indication may specify a desire to utilize the subsection of the active bandwidth part or the entirety of the active bandwidth part. The base station 12 may utilize this information in the scheduling request when determining the corresponding scheduling grants.

As described herein, the base station 12 may dynamically adjust bandwidth utilization by electronic devices 14 in order to enable reduced power consumption. The base station 12 may include operational components for carrying out activation of, deactivation of, and operations during a reduced bandwidth mode as described herein, in addition to general wireless communications, and other functions of the base station 12. For instance, the base station 12 may include a control circuit 18 that is responsible for overall operation of the base station 12, including controlling the base station 12 to carry out the operations described in greater detail below. The control circuit 18 includes a processor 20 that executes code 22, such as an operating system and/or other applications. The functions described in this disclosure document may be embodied as part of the code 22 or as part of other dedicated logical operations of the base station 12. The logical functions and/or hardware of the base station 12 may be implemented in other manners depending on the nature and configuration of the base station 12. Therefore, the illustrated and described approaches are just examples and other approaches may be used including, but not limited to, the control circuit 18 being implemented as, or including, hardware (e.g., a microprocessor, microcontroller, central processing unit (CPU), etc.) or a combination of hardware and software (e.g., a system-on-chip (SoC), an application-specific integrated circuit (ASIC), etc.).

The code 22 and any stored data (e.g., data associated with the operation of the base station 12) may be stored on a memory 24. The code may be embodied in the form of executable logic routines (e.g., a software program) that is stored as a computer program product on a non-transitory computer readable medium (e.g., the memory 24) of the base station 12 and is executed by the processor 20. The functions described as being carried out by the base station 12 may be thought of as methods that are carried out by the base station 12.

The memory 24 may be, for example, one or more of a buffer, a flash memory, a hard drive, a removable media, a volatile memory, a non-volatile memory, a random access memory (RAM), or other suitable device. In a typical arrangement, the memory 24 includes a non-volatile memory for long term data storage and a volatile memory that functions as system memory for the control circuit 18. The memory 24 is considered a non-transitory computer readable medium.

The base station 12 includes communications circuitry that enables the base station 12 to establish various communication connections. For instance, the base station 12 may have a network communication interface 26 to communicate with the network medium 16. Also, the base station 12 may have a wireless interface 28 over which wireless communications are conducted with the electronic devices 14, including the dynamic bandwidth allocations described herein. The wireless interface 28 may include a radio circuit having one or more radio frequency transceivers (also referred to as a modem), at least one antenna assembly, and any appropriate tuners, impedance matching circuits, and any other components needed for the various supported frequency bands and radio access technologies.

The electronic devices 14 serviced by the base station 12 may be user devices, also known as user equipment or UEs, wireless communications devices, or machine-type devices. Exemplary electronic devices 14 include, but are not limited to, mobile radiotelephones (such as "smartphones"), tablet computing devices, computers, a device that uses machine-type communications, machine-to-machine (M2M) communications or device-to-device (D2D) communication (e.g., a sensor, a machine controller, an appliance, etc.), a camera, a media player, or any other device that conducts wireless communications with the base station 12.

Figure 2:
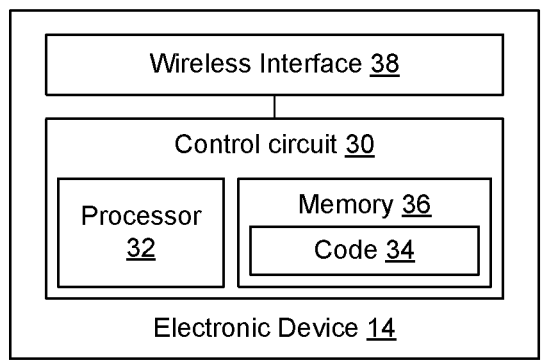
FIG. 2 is a schematic block diagram of an electronic device that forms part of the network communication system of FIG. 1.

As shown in FIG. 2, each electronic device 14 may include operational components for carrying out the wireless communications, the adaptive bandwidth utilization described herein and other functions of the electronic device 14. For instance, among other components, each electronic device 14 may include a control circuit 30 that is responsible for overall operation of the electronic device 14, including controlling the electronic device 14 to carry out the operations described in greater detail below. The control circuit 30 includes a processor 32 that executes code 34, such as an operating system and/or other applications. The functions described in this disclosure document may be embodied as part of the code 34 or as part of other dedicated logical operations of the electronic device 14. The logical functions and/or hardware of the electronic device 14 may be implemented in other manners depending on the nature and configuration of the electronic device 14. Therefore, the illustrated and described approaches are just examples and other approaches may be used including, but not limited to, the control circuit 30 being implemented as, or including, hardware (e.g., a microprocessor, microcontroller, central processing unit (CPU), etc.) or a combination of hardware and software (e.g., a system-on-chip (SoC), an application-specific integrated circuit (ASIC), etc.).

The code 34 and any stored data (e.g., data associated with the operation of the electronic device 14) may be stored on a memory 36. The code 34 may be embodied in the form of executable logic routines (e.g., a software program) that is stored as a computer program product on a non-transitory computer readable medium (e.g., the memory 36) of the electronic device 14 and is executed by the processor 32. The functions described as being carried out by the electronic device 14 may be thought of as methods that are carried out by the electronic device 14.

The memory 36 may be, for example, one or more of a buffer, a flash memory, a hard drive, a removable media, a volatile memory, a non-volatile memory, a random access memory (RAM), or other suitable device. In a typical arrangement, the memory 36 includes a non-volatile memory for long term data storage and a volatile memory that functions as system memory for the control circuit 30. The memory 36 is considered a non-transitory computer readable medium.

The electronic device 14 includes communications circuitry that enables the electronic device 14 to establish various communication connections. For instance, the electronic device 14 may have a wireless interface 38 over which wireless communications are conducted with the base station 12, including the dynamic bandwidth allocation procedures described herein. The wireless interface 38 may include a radio circuit having one or more radio frequency transceivers (also referred to as a modem), at least one antenna assembly, and any appropriate tuners, impedance matching circuits, and any other components needed for the various supported frequency bands and radio access technologies.

Other components of the electronic device 14 may include, but are not limited to, user inputs (e.g., buttons, keypads, touch surfaces, etc.), a display, a microphone, a speaker, a camera, a sensor, a jack or electrical connector, a rechargeable battery and power supply unit, a SIM card, a motion sensor (e.g., accelerometer or gyro), a GPS receiver, and any other appropriate components.

Dynamic Bandwidth Operation

The network communication system 10 may utilize a dynamically adjusted bandwidth allocation for transmissions between the base station 12 and the electronic devices 14. The base station 12 schedules bandwidth allocations for the electronic devices 14 without reassigning or reconfiguring bandwidth part configurations. In particular, the base station 12 may schedule electronic devices 14 to utilize a limited portion or a subsection of a bandwidth part. The electronics devices 14 may perform monitoring and/or measurements (e.g. transmit sounding reference signals (SRS) and/or perform downlink channel measurements) within the subsection as well as restrict communication with the base station 12 to the subsection. Accordingly, when dynamically configured, the electronic devices 14 do not monitor a wider bandwidth that requires higher power consumption. Periodically, however, electronic devices 14 operating with reduced bandwidth (e.g., within a subsection of a bandwidth part), may measure and report channel quality over a larger portion or an entirety of the bandwidth part.

A trigger criterion for reduce bandwidth operations may be based on time. For instance, an electronic device 14, which is configured with a new active bandwidth part, may initially monitor the full bandwidth part. After a predetermined period of time, the electronic device 14 may reduce the monitored or utilized bandwidth to a subsection of the full bandwidth part. The electronic device 14 may also transmit assistance information to base station 12. For instance, the electronic device 14 can include an indicator in a scheduling request to inform the base station 12 of a bandwidth preference (e.g. a desire to use the entire bandwidth part or a subsection thereof). The bandwidth preference may be based on capabilities of the electronic device 14, traffic conditions (e.g., packet arrival time, packet size), buffer status, a required quality of service level (e.g. latency or data rate) or the like.

Figure 3:
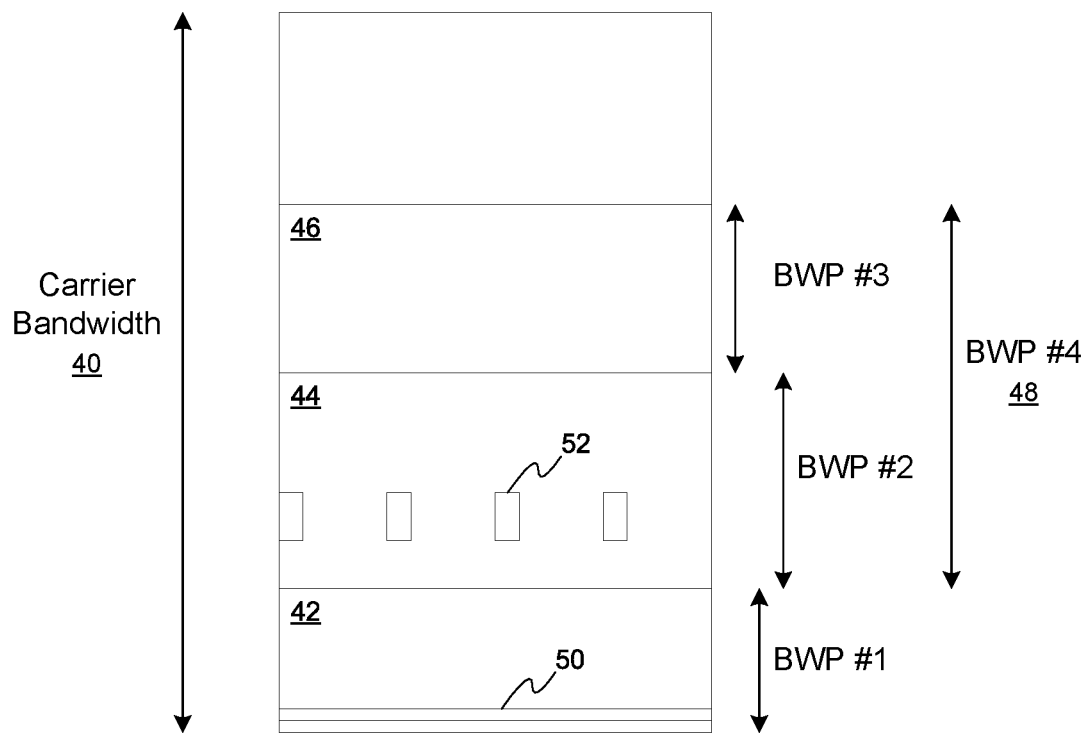
FIG. 3 is a schematic diagram of an exemplary configuration of bandwidth parts in accordance with an aspect.

In NR system, for example, user devices may be assigned bandwidth parts. A bandwidth part is a smaller portion of a bandwidth compared to a carrier bandwidth. A bandwidth part consists of a group of contiguous physical resource blocks. With reference to FIG. 3, an exemplary schematic diagram of a bandwidth part configuration is illustrated. As shown in FIG. 3, a UE (e.g. an electronic device 14) can be configured to utilize smaller portions of a carrier bandwidth 40. These smaller portions include bandwidth parts 42-48 (BWPs #1-4). According to an example, carrier bandwidth 40 may be 1 GHz for NR systems and the bandwidth parts 42-48 may be on the order of hundreds of megahertz.

Bandwidth parts 42-48 consist of contiguous groups of physical resource blocks 50. The UE may be configured with up to 3 additional bandwidth parts in addition to a default bandwidth part 44. The default bandwidth part 44 includes transmissions of synchronization signal blocks (SSBs) from a network node. As described above, the SSBs include PSS, SSS, and BCH. While the UE may be configured with bandwidth parts 42-48 as shown in FIG. 3, the UE may utilize one bandwidth part at a time, which is referred to as an active bandwidth part.

Figure 4:
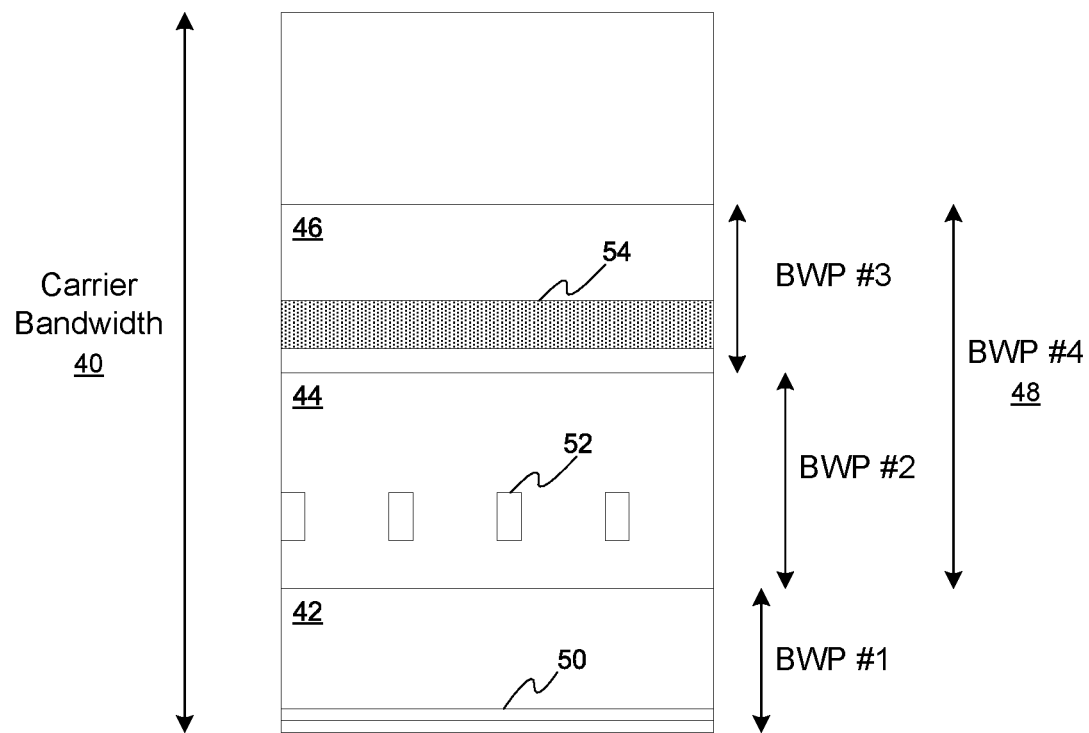
FIG. 4 is a schematic diagram of a technique to adaptively configure bandwidth utilization to a subsection of a configured bandwidth.

In order to reduce UE power consumption during a connected mode (e.g., RRC_CONNECTED), the UE may be dynamically adjusted by a network node to utilized a reduced bandwidth. With reference to FIG. 4, a subsection 54 of an active bandwidth part 46 may be allocated to the UE. The subsection 54 represents a minimum bandwidth that the UE monitors, measures, and/or utilizes for data transmissions with a network node. In effect, while operating in a reduced bandwidth mode, the UE's bandwidth is limited to the subsection 54. The UE may also reduce a sampling rate to further reduce power consumption, particularly during periods with no or little amounts of data to transfer. As shown in FIG. 4, the subsection 54 is introduced in the active bandwidth part 46. A network node (e.g. a base station) may schedule allocation of subsection 54 with signaling that indicates a size of the subsection 54. The size of subsection 54 may be specified as a fraction of the active bandwidth part 46 or by indexing a predefined size in a set of predefined sizes (e.g., 5, 10, 15, 20, 40, 80 MHz, etc.).

According to further aspects, the network node may configure the UE with multiple version of subsections 54. For example, one subsection may be 10% of the bandwidth part while a second subsection may be 50% of the bandwidth part. Further, the subsection 54 may utilize a different numerology (e.g. different subcarrier spacing and/or symbol length) compared to the active bandwidth part 46. In NR system, different bandwidth parts may use different numerology. This concept may be extended so that signals within the subsection 54 use a different numerology compared to signals transmitted within the entire bandwidth part 46.

In NR systems, a bandwidth part includes a search space for control signal monitoring. For instance, each configured bandwidth part may include at least one control resource set (CORESET) with a UE-specific search space (USS). The USS includes resources a UE monitors for possible reception for control information destined for the UE. In a primary carrier, at least one configured bandwidth part includes a CORESET with a common search space (CSS). The CSS is monitored by the UE for possible reception of control information common to all UEs or destined for the particular UE. If a CORESET of a bandwidth part is not configured with CSS, the UE is not required to monitor it for possible control signal reception.

Figure 5:
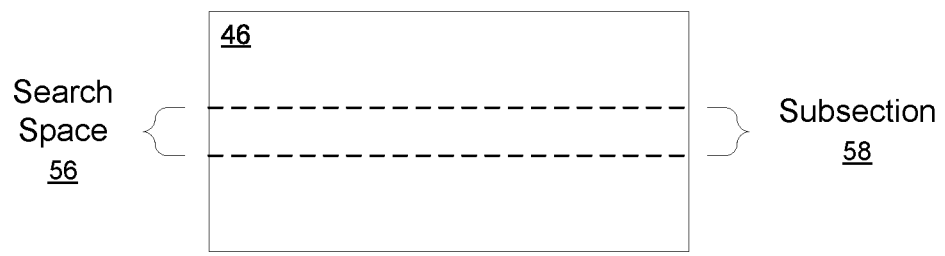
FIG. 5 is a schematic diagram of an exemplary configuration for the subsection of bandwidth of FIG. 4.
Figure 6:
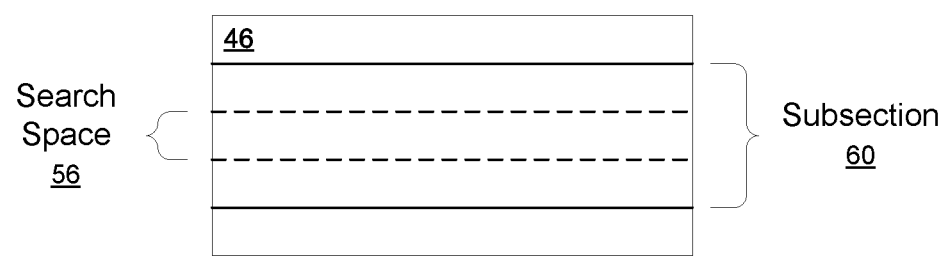
FIG. 6 is a schematic diagram of an exemplary configuration for the subsection of bandwidth of FIG. 4.

With reference to FIGS. 5 and 6, the active bandwidth part 46 may include a search space 56, which may be a UE-specific or common search space as described above. According to one embodiment, as shown in FIG. 5, a subsection 58 of the active bandwidth part 46, which is dynamically allocated to a UE for reduced bandwidth operations, may be equal to the search space 56. In this example, the UE performs channel measurements, SRS transmission and data communication on the same bandwidth monitored for possible control signaling. Alternatively, as shown in FIG. 6, a subsection 60 of the active bandwidth part 46 may be different from the search space 56. In this example, the UE can perform measurements, SRS transmission, and other data communication over different bandwidth than the bandwidth monitored for control signaling. Still further, the subsection may include the search space 56 as shown in FIG. 6 or be separate from the search space so that different small portions of bandwidth are used for monitoring versus measurement and communication.

Figure 7:
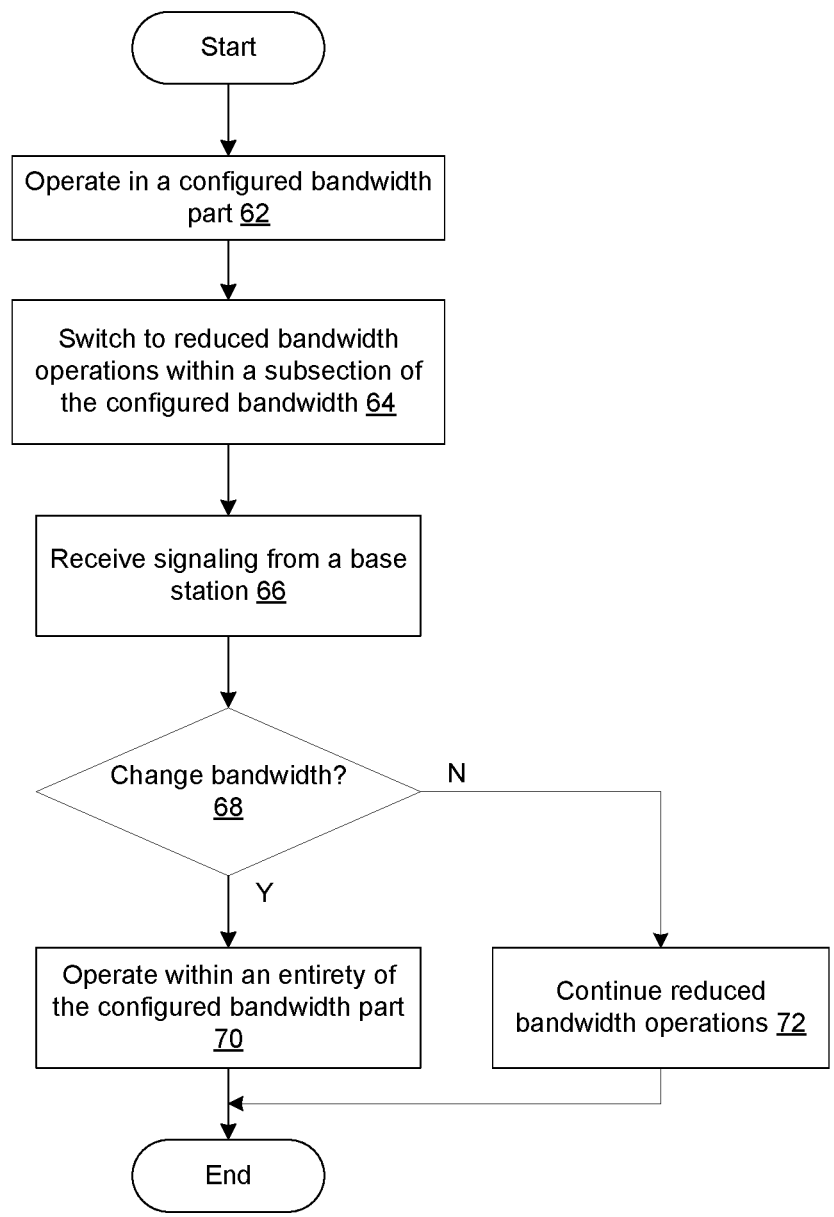
FIG. 7 is a flow-diagram of a representative method of adaptive bandwidth utilization of a configured bandwidth part by a wireless communications device.
Figure 8:
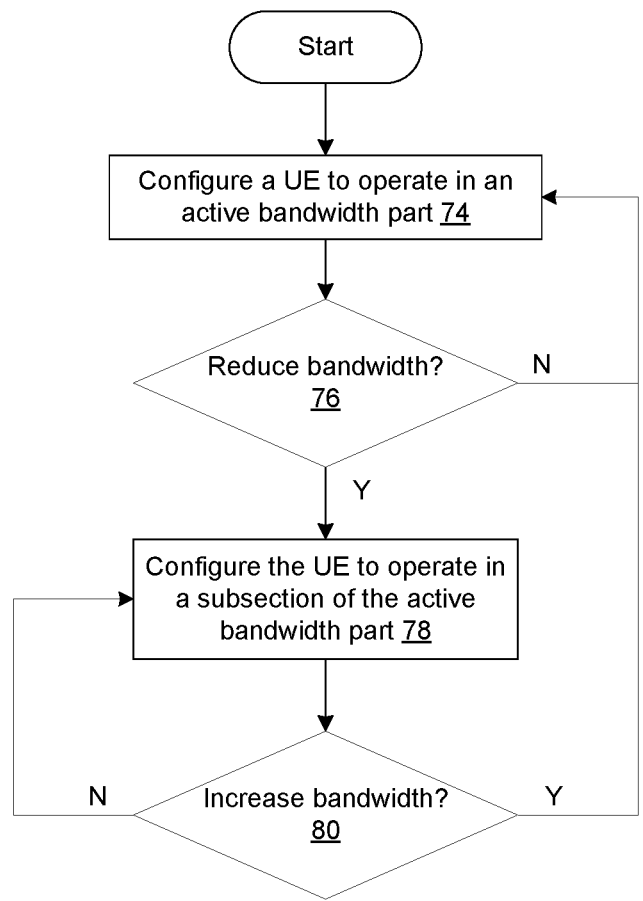
FIG. 8 is a flow diagram of a representative method of configuring a UE for adaptive bandwidth utilization of a configured bandwidth.

Turning to FIG. 7, shown is an exemplary flow diagram representing steps that may be carried by the electronic device 14 when executing logical instructions to carry out dynamic bandwidth operations as described above. Complimentary operations of the base station 12 are shown in FIG. 8, which an exemplary flow diagram representing steps that may be carried out by the base station 12 when performing adaptive adjustments to bandwidth utilization by electronic devices 14. Although illustrated in a logical progression, the blocks of FIGS. 7 and 8 may be carried out in other orders and/or with concurrence between two or more blocks. Therefore, the illustrated flow diagrams may be altered (including omitting steps or adding steps not shown in order to enhance description of certain aspects) and/or may be implemented in an object-oriented manner or in a state-oriented manner. Also, the method represented by FIG. 7 may be carried out apart from the method of FIG. 8 and vice versa.

Referring to actions carried out by the electronic device 14, shown in FIG. 7, the logical flow of implementing reduced bandwidth operations may start in block 62. It may be assumed that electronic device 14 has been previously configured with one or more bandwidth parts, including an active bandwidth part, by a network node. Accordingly, in block 62, the electronic device 14 operates within the active bandwidth part. Such operations may include monitoring for control signaling, performing channel measurements, transmitting SRS, and/or exchanging data traffic (uplink or downlink) with base station 12.

As described above, after a period of time after initial configuration or during periods of low data traffic, the electronic device 14 may enter a reduced bandwidth mode in block 64. To switch to reduced bandwidth mode, the electronic device 14 is dynamically allocated, by base station 12, a subsection of the active bandwidth part. In reduced bandwidth mode, the electronic device 14 monitors for control signaling, performs channel measurements, and perform data communication within only the subsection dynamically allocated.

In block 66, the electronic device 14 receives signaling (e.g. an uplink or downlink scheduling grant) from the base station 12. The signaling may include an indication regarding dynamic bandwidth utilization. In block 68, it is determined whether the indication instructs the electronic device 14 to change bandwidth utilized. If a change is indicated, the electronic device 14 operates within an entirety of the active bandwidth part in block 70. If a change is not indicated, the electronic device 14 continues reduced bandwidth operations in block 72. That is, the electronic device 14 continues operations within the subsection of the active bandwidth part.

The electronic device 14, operating only within the subsection, may periodically measure and report channel quality over a bandwidth greater than the subsection. The periodic measurements enable the network to maintain awareness of channel conditions over the entire bandwidth part (e.g. at least with a certain periodicity). For the uplink, the electronic 14 may periodically transmit SRS over the subsection or a wider bandwidth up to an entirety of the active bandwidth part. For the downlink, the base station 12 may transmit a downlink pilot (e.g. CSI-RS) over the subsection or a wider bandwidth up to the entire active bandwidth part. A measurement gap technique similar to the technique in NR systems can be employed to enforce the periodic measurements beyond the subsection.

Referring to FIG. 8, exemplary actions carried out by the base station 12 are illustrated. The actions carried out by the base station 14 may, in some case, be complementary to the actions carried out by the electronic device 14, which were described above. The logical flow of managing reduced bandwidth operations for the electronic device 14 may start in block 74. In block 74, the electronic device 14 or UE is configured to operate in an active bandwidth part. In block 76, a determination is made as to whether or not to reduce bandwidth utilization for the UE. This determination may be based on traffic conditions, buffer status, or other UE activity. For instance, low data traffic may trigger a switch to reduced bandwidth operation. Buffer status reporting from the UE may inform the base station 12 of data traffic conditions.

In another example, a lack of UE activity may trigger activation of reduced bandwidth operation. For instance, a UE configured with an active bandwidth part may initially monitor an entirety of the bandwidth part. After a predetermined period of time with no activity or activity below a predetermined threshold, the base station 12 may determine to switch the UE to reduced bandwidth operation. For example, NR systems include a timer for when an additional bandwidth part should be removed due to inactivity. The timer for reducing to reduced bandwidth operation may be shorter than the inactivity timer associated with the entirety of the bandwidth part. Accordingly, the base station 12 may switch the UE to utilize a subsection of the bandwidth part after a first period of time before removing the entire bandwidth part after a second period of time.

In block 76, if reduced bandwidth operation is not activated, the base station 12 maintains the configuration of the UE to utilize the active bandwidth part. However, if reduced bandwidth operation is to be activated, the base station 12 configures the UE to utilize a subsection of the active bandwidth part in block 78. The base station 12 may transmit control signaling informing the UE of the allocation of the subsection, including a size thereof. While the UE is in reduced bandwidth operation, the base station 12 may determine whether or not to increase bandwidth in block 80. The determination may be based on an amount of downlink data to be transmitted to the UE and/or the required latency of downlink data. The determination may also be based on packet arrival times and/or packet size. Further still, the determination may be based on buffer status reporting from the UE, an amount of uplink data to be transmitted, required quality of service level (latency and/or data rate) for uplink data, or an explicit preference indicated by the UE (e.g. in a scheduling request). If the bandwidth is not to be increased, the base station 12 may signal the UE to maintain reduced bandwidth operation within the subsection already allocated. If an increase is determined, the base station 12 allocates a bandwidth larger than the subsection, up to the entirety of the active bandwidth part, to the UE.

Figure 9:
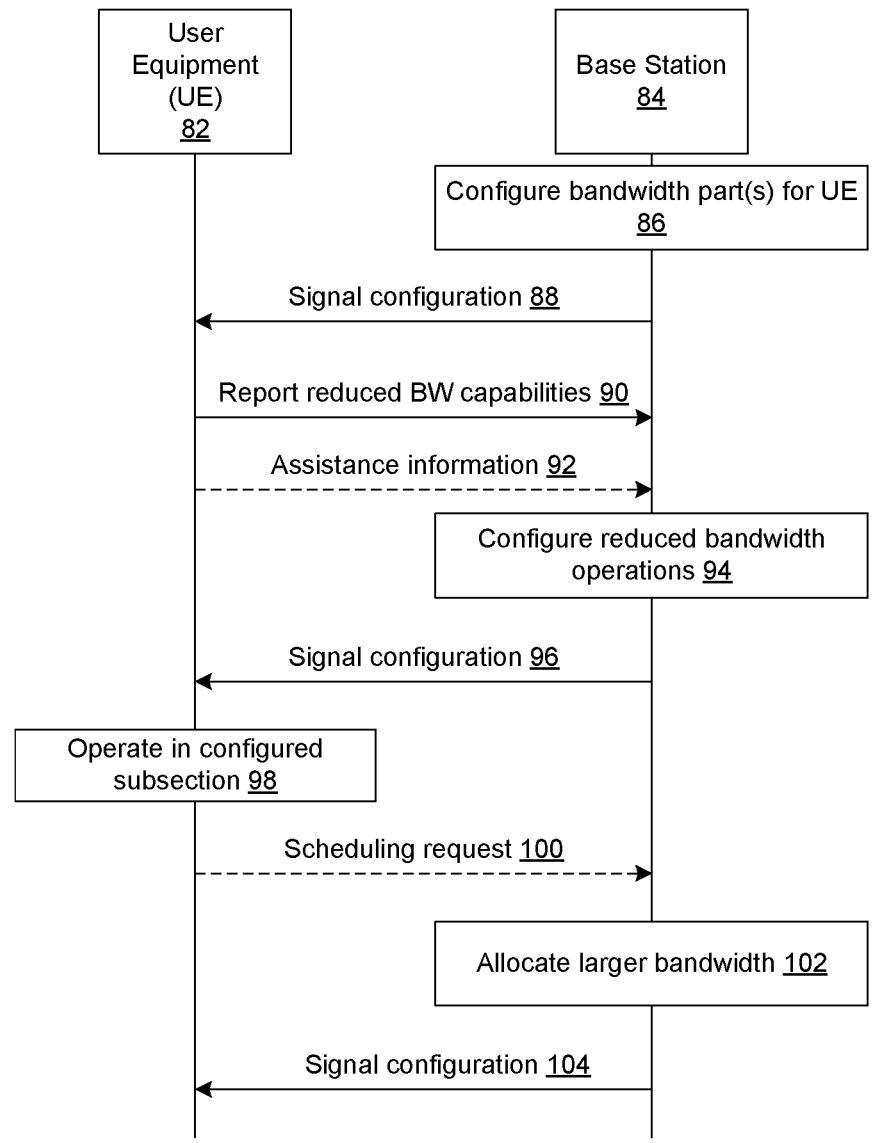
FIG. 9 is a signaling diagram of an exemplary procedure to configure adaptive bandwidth operations.

Turning to FIG. 9, an exemplary signaling diagram for implementing dynamic bandwidth utilization is illustrated. As shown in FIG. 9, a base station 84, which may be similar to base station 12 described above, interacts with a UE 82, which may be similar to electronic device 14 described above. Initially, base station 84 or other network node configures one or more bandwidth parts for UE 82. The configured bandwidth parts include allocation of an active bandwidth part. The base station 84 signals the configuration to UE 82 at 88. The UE 82 may report, at 90, its capabilities for reduced bandwidth operations to base station 84. The UE 82 may optionally transmit assistance information 92 to the base station 84. The assistance information indicates a preference for reduce bandwidth operation or normal operations within an entirety of the active bandwidth part.

At 94, the base station 84 may configure the UE 82 for reduced bandwidth operation. In particular, the base station 84 allocates a subsection of the active bandwidth part for utilization by the UE 82. The configuration for operations within the subsection of the active bandwidth part is signaled, at 96, to the UE 82. The configuration may be signaled on a control channel, for example. At 98, the UE operates within the subsection allocated as described previously.

At 100, the UE 82 may optionally transmit a scheduling request to base station 84. The scheduling request may indicate a preference to remain on the subsection of the active bandwidth part or to utilizes a larger bandwidth. At 102, the base station 84 may allocate a larger bandwidth up to an entirety of the active bandwidth part and signal the updated configuration to the UE 82 at 104. It is to be appreciated that the above sequence is exemplary and alternative orders may be employed.

CONCLUSION

Although certain embodiments have been shown and described, it is understood that equivalents and modifications falling within the scope of the appended claims will occur to others who are skilled in the art upon the reading and understanding of this specification.

What is claimed is:

1. A method for adaptive bandwidth operation performed by a network node of a wireless communications system, comprising:
   scheduling a subsection of an active bandwidth part, allocated to a wireless communications device, for use by the wireless communications device; and
   signaling allocation of the subsection of the active bandwidth part to the wireless communications device to reduce a bandwidth available to the wireless communications device from the active bandwidth part to the subsection of the active bandwidth part.

2. The method of claim 1, further comprising determining that the wireless communications device can operate within a reduced bandwidth relative to the active bandwidth part.

3. The method of claim 2, wherein determining that the wireless communication device can operate within the reduced bandwidth further comprises evaluating traffic conditions related to the wireless communication device.

4. The method of claim 1, wherein determining that the wireless communications device can operate within the reduced bandwidth further comprises identifying that the wireless communications device has not utilized the active bandwidth part for a predetermined period of time.

5. The method of claim 1, further comprising:
   determining that the wireless communications device, operating within the subsection of the active bandwidth part, should operate with a larger subsection of the active bandwidth part;
   scheduling the wireless communications device to utilize the larger subsection of the active bandwidth part; and
   signaling the scheduling of the larger subsection to the wireless communications device.

6. The method of claim 5, wherein the larger subsection of the bandwidth part comprises an entirety of the active bandwidth part.

7. The method of claim 1, further comprising:
   receiving a signal from the wireless communications device that provides assistance information related to bandwidth utilization; and
   determining whether the wireless communications device should operate within the subsection of the active bandwidth part based on the assistance information.

8. The method of claim 1, further comprising allocating a plurality of subsections of the active bandwidth part to the wireless communications device, wherein the plurality of subsections have different characteristics.

9. A wireless network node in a communication system, comprising
   a wireless interface over which wireless communications with wireless communications devices are carried out over a plurality of bandwidth parts of a system bandwidth respectively configured for each wireless communications device; and
   a control circuit configured to adaptively configure bandwidth utilization of the wireless communications devices, wherein the control circuit causes the network node to:
   identify a condition that indicates that a wireless communications device can operate within a reduced bandwidth;
   schedule a subsection of an active bandwidth part utilization by the wireless communications device; and
   signal allocation of the subsection of the active bandwidth part to the wireless communications device to reduce a bandwidth available to the wireless communications device from the active bandwidth part to the subsection of the active bandwidth part.

10. The network node of claim 9, wherein the control circuit further causes the network node to initially configure the wireless communications device with one or more bandwidth parts, wherein at least one bandwidth part is the active bandwidth part.

11. The network node of claim 9, wherein the control circuit further causes the network node to signal the initial configuration of the active bandwidth part to the wireless communications device.

12. The network node of claim 9, wherein the condition includes at least one of:
   a packet arrival time or packet size;
   a buffer status;
   an amount of data to be transferred between the wireless communications device and the network node; and/or
   a required latency or a required data rate for data to be transmitted.

13. The network node of claim 9, wherein the control circuit further causes the network node to identify that the wireless communications device has not utilized the active bandwidth part for a predetermined period of time.

14. The network node of claim 9, wherein the control circuit further causes the network node to:
   determine that the wireless communications device, operating within the subsection of the active bandwidth part, should switch to operate within a larger subsection of the active bandwidth part;
   schedule the wireless communications device to utilize the larger subsection of the active bandwidth part; and
   signal the scheduling of the larger subsection to the wireless communications device.

15. The network node of claim 9, wherein the control circuit further causes the network node to:
   receive a signal from the wireless communications device that provides assistance information related to bandwidth utilization; and
   determine whether the wireless communications device should operate within the subsection of the active bandwidth part or a larger bandwidth based on the assistance information.

16. A method for adaptive bandwidth operation by a wireless communications device, comprising:
   receiving a signal from a network node of a wireless communications system to reduce a bandwidth available to the wireless communication device from a configured active bandwidth part to a subsection of the configured active bandwidth part; and performing measuring, monitoring, or data communication operations within the subsection of the configured active bandwidth part.

17. The method of claim 16, wherein the subsection of the configured active bandwidth part is the only bandwidth utilized by the wireless communication device for:

monitoring for control signaling from the network node;
performing measurements of channels; or
transmitting data to and/or receiving data from the network node.

18. The method of claim 16, further comprising transmitting assistance information to the network node, wherein the assistance information is indicative of a preference for activation or deactivation of reduced bandwidth operations within the subsection of the configured active bandwidth part.

19. The method of claim 16, further comprising:

periodically measuring channel quality over an entirety of the configured active bandwidth part; and reporting the channel quality measured to the network node.

20. The method of claim 16, further comprising:

receiving a signal from network node to switch from utilizing the subsection of the configured active bandwidth part to an entirety of the configured active bandwidth part; and performing operations within the entirety of the configured active bandwidth part.

* * * * *